US011172438B2

(12) United States Patent
Imai

(10) Patent No.: US 11,172,438 B2
(45) Date of Patent: Nov. 9, 2021

(54) TERMINAL DEVICE, CONNECTION TARGET SETTING METHOD, AND STORAGE MEDIUM

(71) Applicant: CASIO COMPUTER CO., LTD., Tokyo (JP)

(72) Inventor: Yuji Imai, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 31 days.

(21) Appl. No.: 16/715,990

(22) Filed: Dec. 16, 2019

(65) Prior Publication Data

US 2020/0196229 A1 Jun. 18, 2020

(30) Foreign Application Priority Data

Dec. 17, 2018 (JP) .............................. JP2018-235297

(51) Int. Cl.
*H04W 48/20* (2009.01)
*H04W 76/11* (2018.01)
(Continued)

(52) U.S. Cl.
CPC ............. *H04W 48/20* (2013.01); *H04W 8/12* (2013.01); *H04W 48/16* (2013.01); *H04W 76/11* (2018.02)

(58) Field of Classification Search
CPC ....... H04W 48/20; H04W 76/11; H04W 8/12; H04W 48/16
See application file for complete search history.

(56) References Cited

U.S. PATENT DOCUMENTS

2010/0201520 A1* 8/2010 Stern .................... G01S 13/765
340/572.1
2019/0053137 A1* 2/2019 Watanabe ........... H04W 40/244

FOREIGN PATENT DOCUMENTS

JP 2005-064653 A 3/2005
JP 2005-184729 A 7/2005
(Continued)

OTHER PUBLICATIONS

JPO; Application No. 2018-235297; Notice of Reasons for Refusal dated Feb. 9, 2021.

*Primary Examiner* — Said M Elnoubi
(74) *Attorney, Agent, or Firm* — Fitch, Even, Tabin & Flannery LLP

(57) ABSTRACT

A terminal device includes a communication unit that performs wireless communication with one wireless communication device set as a communication connection target; a reader that reads a predetermined identification mark; and a processor. The processor performs a connection target setting process including selection of a wireless communication device with which the communication unit performs wireless communication and setting operation of setting the wireless communication device as the communication connection target. The processor further performs a movement detection process of detecting a movement of the terminal device causing a predetermined requirement based on a read identification mark that is read by the reader and position correspondence information in which an identification mark is associated with information relating to a position of a corresponding identification mark. If a movement causing the predetermined requirement is detected in the movement detection process, the setting operation is performed in the connection target setting process.

10 Claims, 9 Drawing Sheets

(51) Int. Cl.
*H04W 8/12* (2009.01)
*H04W 48/16* (2009.01)

(56) References Cited

FOREIGN PATENT DOCUMENTS

| | | | |
|---|---|---|---|
| JP | 2006-135727 A | | 5/2006 |
| JP | 2006135727 A | * | 5/2006 |
| JP | 2011-199447 A | | 10/2011 |

* cited by examiner

| BAR CODE | PRODUCT NAME | THEORETICAL STOCK QUANTITY | ACTUAL STOCK QUANTITY |
|---|---|---|---|
| BAR CODE B1 | PRODUCT NAME b1 | 32 | |
| BAR CODE B2 | PRODUCT NAME b2 | 26 | |
| BAR CODE B3 | PRODUCT NAME b3 | 13 | |

| BAR CODE | PRODUCT NAME | THEORETICAL STOCK QUANTITY | ACTUAL STOCK QUANTITY |
|---|---|---|---|
| BAR CODE B1 | PRODUCT NAME b1 | 32 | 32 |
| BAR CODE B2 | PRODUCT NAME b2 | 26 | |
| BAR CODE B3 | PRODUCT NAME b3 | 13 | |

TERMINAL DEVICE, CONNECTION TARGET SETTING METHOD, AND STORAGE MEDIUM

CROSS-REFERENCE TO RELATED APPLICATIONS

This application is based upon and claims the benefit of priority from the prior Japanese Patent Application No. 2018-235297, filed on Dec. 17, 2018, the entire contents of which are incorporated herein by reference.

BACKGROUND

1. Field of the Invention

The technical field of the present application relates to a terminal device, a connection target setting method, and a storage medium.

2. Description of the Related Art

Conventionally, there is a terminal device capable of sending and receiving data via wireless communication with a wireless communication device such as an access point of a wireless Local Area Network (LAN). In some technique, in response to movement of the terminal device or change its connection status, one wireless communication device capable of performing communication in a good connection status is selected from multiple wireless communication devices each time, so that a wireless communication device connected to the terminal device can be switched. Such switching of the wireless communication device as a target of communication connection is also called roaming.

For example, JP 2011-199447A discloses a technique of switching a wireless communication device to be connected when the wireless communication device sends a radio wave whose intensity is equal to or less than a predetermined reference value. JP 2005-184729A discloses a technique of switching a wireless communication device to be connected when movement of a terminal device having a position detector is detected based on the detected position of the terminal device.

However, according to the technique disclosed in JP 2011-199447A, if the reference value used to determine the radio wave intensity is too large, the power consumption increases due to the frequently repeated switching process of the wireless communication device to be connected. On the other hand, if the reference value is too small, the switching process of the wireless communication device to be connected does not readily start even when there is a wireless communication device capable of performing communication in a better connection status. As a result, low-quality communication is continued.

According to the technique disclosed in JP 2005-184729A, the position detector provided in the terminal device complicates the configuration of the terminal device and increases the cost of the terminal device.

As described above, it is not easy to efficiently switch the wireless communication device to be connected with a simple configuration according to the conventional techniques.

SUMMARY

According to an aspect of the present invention, there is provided a terminal device including:
a communication unit that performs wireless communication with one wireless communication device set as a communication connection target;
a reader that reads a predetermined identification mark; and
a processor that performs:
a connection target setting process including selection of a wireless communication device with which the communication unit performs wireless communication and setting operation of setting the wireless communication device as the communication connection target; and
a movement detection process of detecting a movement of the terminal device causing a predetermined requirement based on a read identification mark that is read by the reader and position correspondence information in which an identification mark is associated with information relating to a position of a corresponding identification mark; wherein,
if a movement causing the predetermined requirement is detected in the movement detection process, the setting operation is performed in the connection target setting process.

BRIEF DESCRIPTION OF THE DRAWINGS

FIGS. 3A and 3B each shows an example of contents of product stock data.

DETAILED DESCRIPTION

Hereinafter, embodiments of a terminal device, a connection target setting method, and a storage medium of the present invention will be described with reference to the drawings.

First Embodiment

Figure 1:
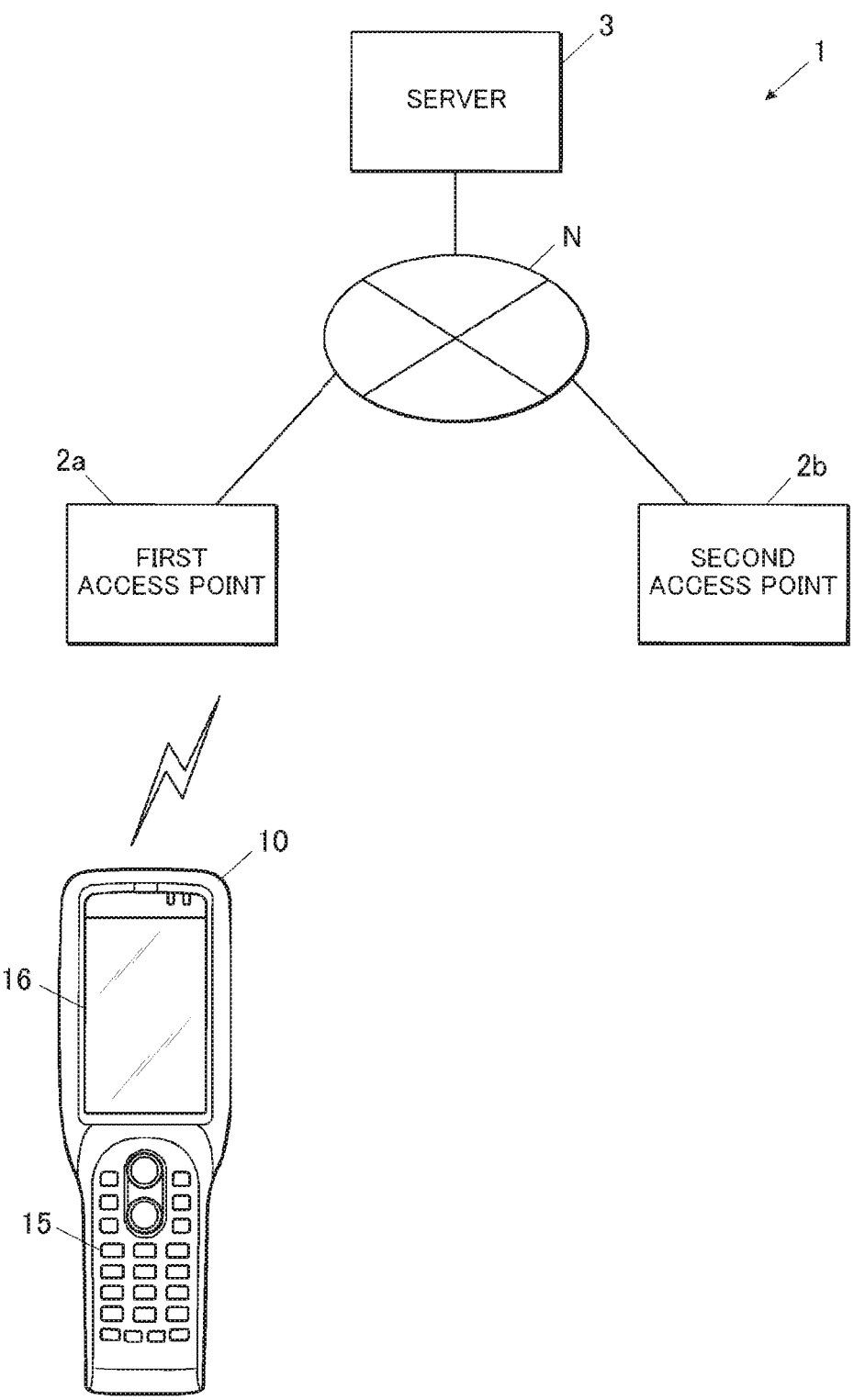
FIG. 1 is a schematic diagram showing configuration of an information acquisition management system.

FIG. 1 is a schematic diagram showing a configuration of an information acquisition management system according to a first embodiment.

The information acquisition management system 1 in FIG. 1 includes a handheld terminal 10 as a terminal device, a first access point 2a and a second access point 2b as wireless communication devices that perform wireless communication (here, wireless LAN communication) with the handheld terminal 10, and a server 3. Hereinafter, when either the first access point 2a or the second access point 2b is described without distinction, it is also simply referred to as an "access point 2."

The access point 2 is a relay device for wireless LAN communication. The access point 2 each performs wireless LAN communication with a handheld terminal 10 within a predetermined distance from the access point 2.

The server 3 is connected to the first access point 2a and the second access point 2b via the communication network N, and stores and manages information sent from the handheld terminal 10 via the first access point 2a or the second access point 2b. There may be provided multiple servers 3. The communication network N may be the Internet, for example, or a network such as LAN or a Wide Area Network (WAN).

In the information acquisition management system 1, the handheld terminal 10 reads an identification mark (a bar code etc.) attached to an item to be identified (a product etc.) and sends information on the product identified by the read bar code (hereinafter also referred to be bar code information) to the server 3 via wireless communication with the access point 2. The bar code information is managed in the server 3. The content of the bar code information sent to the server 3 is not particularly limited, but may be, for example, information on the quantity of the product counted according to the read bar code, information obtained by decoding the bar code, and information which is associated in advance with the information obtained by decoding the bar code (for example, product information which is associated in advance with a product code obtained by decoding the bar code).

The information acquisition management system 1 can be used, for example, for taking inventory on products in retail business, for picking products in a warehouse in distribution and sales business, and the like. In these cases, the access point 2 is provided in a facility such as a store in the retail business or a warehouse in the distribution and sales business, and the handheld terminal 10 is used in the facility. Meanwhile, the server 3 may be provided at any place without particular limitation, as long as information can be sent to and received from the access point 2 via the communication network N, for example, in the above-mentioned facility or in a remote place.

In the information acquisition management system 1, multiple (in the present embodiment, two) access points 2 are placed in a facility (a store, a warehouse, and the like) in which products to be managed are stored, and the handheld terminal 10 at any position in the facility can wirelessly communicate with at least one of the access points 2. That is, the multiple access points 2 are placed in the facility such that an area outside the communicable range with one access points 2 is within the communicable range of at least the other access point 2. Accordingly, the handheld terminal 10 at any position in the facility can send information to the server 3 via one of the access points 2 by switching the access point 2 as a communication connection target (roaming) depending on the position in the facility. In the example of FIG. 1, the handheld terminal 10 wirelessly communicates with the first access point 2a. The roaming operation by the handheld terminal 10 will be detailed later.

In the present embodiment, the information acquisition management system 1 including two access points 2 is described as an example, but three or more access points 2 may be provided depending on the facility size and the like.

Next, the configuration of the handheld terminal 10 will be described with reference to FIG. 1 and FIG. 2.

Figure 2:
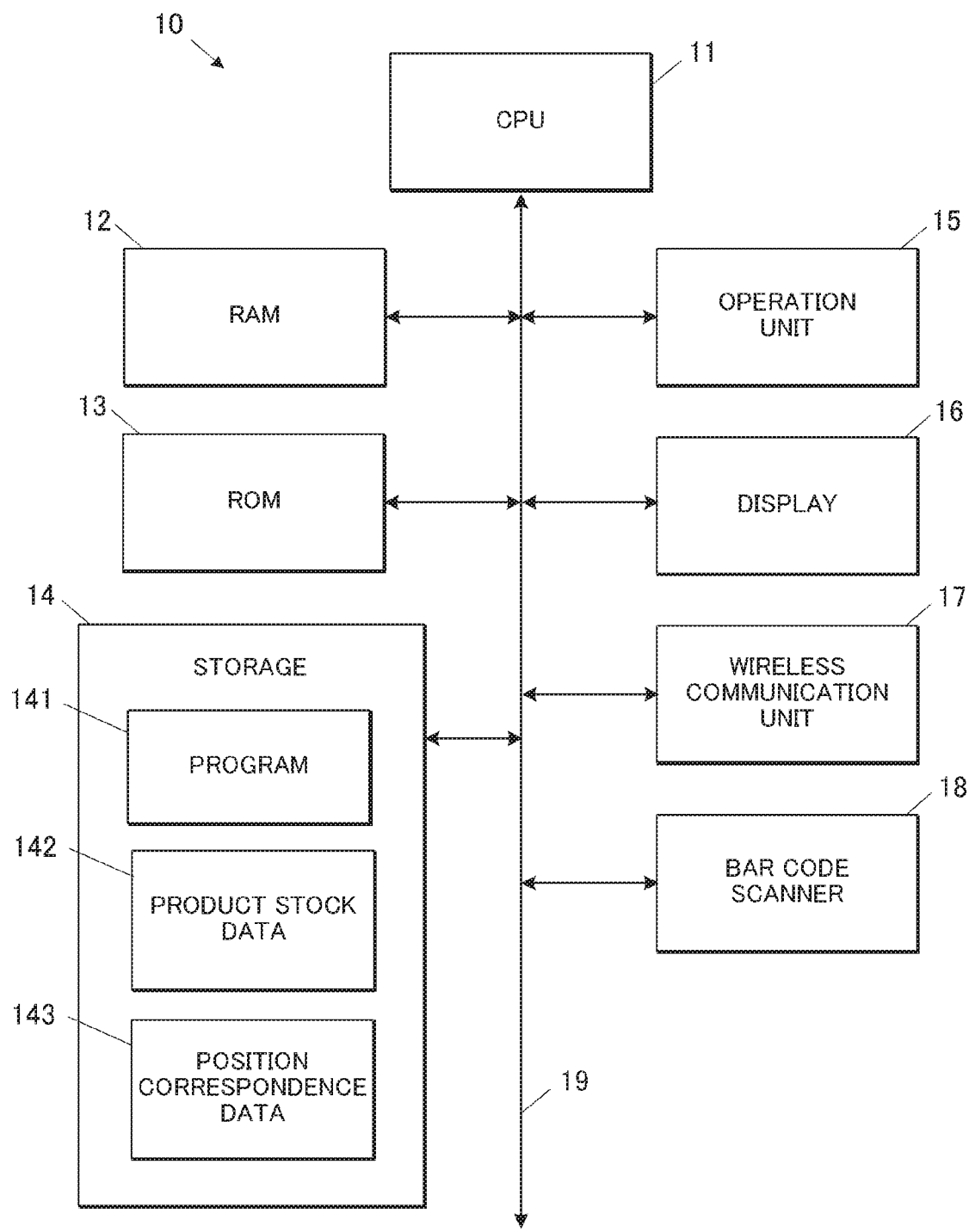
FIG. 2 is a block diagram showing a main functional configuration of the handheld terminal.

FIG. 2 is a block diagram showing the main functional configuration of the handheld terminal 10.

The handheld terminal 10 includes a CPU (Central Processing Unit) 11 that performs, as described later, a connection target setting process, a movement detection process, an information addition process, and a radio wave detection process, a RAM (Random Access Memory) 12, a ROM (Read Only Memory) 13, a storage (non-temporary computer-readable storage medium) 14, an operation receiver 15, a display 16, a wireless communication unit 17 that serves as a communication unit, a bar code scanner 18 that serves as a reader, and a bus 19. The components of the handheld terminal 10 are connected to each other via the bus 19.

The CPU 11 is a processor that performs various processes according to a program 141 stored in the storage and controls each of the components of the handheld terminal 10.

The RAM 12 provides the CPU 11 with a working memory space and stores temporary data. The RAM 12 may include a non-volatile memory.

The ROM 13 is a nonvolatile storage unit from which information can be read, and stores various kinds of setting data and the like.

The storage 14 includes a storage device such as an HDD (Hard Disk Drive), an SSD (Solid State Drive), or a flash memory, which data can be written in and read out, and stores the program 141 and various kinds of data. The data stored in the storage 14 includes product stock data 142 which is used in inventory operation described below and position correspondence data 143 as position correspondence information which is referred to during the roaming.

The operation receiver 15 includes a trigger key for scanning a bar code, a cursor key(s), an input key(s) such as numeral keys or character keys, a function key(s), and the like. In response to the input operation by an operator to the key(s), the operation receiver 15 converts the input operation into an operation signal(s), and sends the operation signal to the CPU 11. The operation receiver 15 may include a touch panel placed on a screen of the display 16 that receives input operation by an operator.

The display 16 includes a liquid crystal display, an organic EL (Electro Luminescence) display, or the like, and displays various kinds of information such as the processing result and the status of the handheld terminal 10.

The wireless communication unit 17 is a communication module including an antenna, a modulation/demodulation circuit, a signal processing circuit, and the like, and controls communication according to a communication standard relating to wireless communication by the wireless LAN. The wireless communication unit 17 receives radio waves from the access points 2 and outputs, to the CPU 11, a radio wave intensity signal representing intensity of the radio waves. Under the control of the CPU 11, the wireless communication unit 17 performs wireless communication with one of the access points 2 which has been set as the communication connection target so as to send and receive information to and from the server 3, which is connected to the access point 2 via the communication network N.

The switching of the access point 2 as the communication connection target (roaming) is performed under the control of the CPU 11 by rewriting BSSID (Basic Service Set Identifier, usually an MAC (Media Access Control) address) of the access point 2 to be connected and the settings of the channel to be used. The operation of the CPU 11, that is, selecting the access point 2 for wireless communication and setting it as the communication connection target, is referred to as "setting operation" in the following.

The bar code scanner 18 decodes the signal obtained by reading a bar code generated according to a predetermined rule, and outputs the decoded signal to the CPU 11. At least a part of the signal decoding process may be performed by the CPU 11.

The bar code scanner 18 of the present embodiment may be a laser scanner, which emits light from a laser diode, receives the light reflected at a bar code, and then converts the intensity distribution of the received reflection light into a digital signal(s). The bar code scanner 18 is not limited to a laser scanner, but may be an imaging device having an optical system and an imaging element, for example. In this case, information can be acquired by decoding imaging data of the bar code (for example, a two-dimensional bar code).

Next, operation relating to acquisition and management of information in the information acquisition management system 1 will be described. In the present embodiment, the information acquisition management system 1 is used for inventory processing of products in a store as an example.

In the inventory processing using the information acquisition management system 1, first, the server 3 sends inventory setting information to the handheld terminal 10 via one of the access points 2. The inventory setting information includes information on a name of a product(s) to be inventoried, a bar code corresponding to the product, and theoretical stock quantity of the product. The contents of the inventory setting information are reflected in the product stock data 142 in the storage 14.

FIG. 3A shows an example of the contents of the product stock data 142.

The product stock data 142 includes, for each product to be inventoried, information on a bar code ("Bar code B1" to "Bar code B3") attached to the product, a product name ("Product b1" to "Product b3"), a theoretical stock quantity, and an actual stock quantity. The theoretical stock quantity is a stock quantity of products theoretically managed in the server 3 based on the purchase and sale of the products. The actual stock quantity is a stock quantity of products actually counted using the handheld terminal 10 for confirmation. As shown in FIG. 3A, no data is present before the start of the inventory processing.

The inventory of products is performed by reading a bar code of each product using the handheld terminal 10. Specifically, when the bar code scanner 18 of the handheld terminal 10 reads any of the Bar codes B1 to B3, counting of the actual stock quantity is started for the product corresponding to the read bar code. Each time a bar code is read, the actual stock quantity of the product corresponding to the bar code in the product stock data 142 is increased by one.

FIG. 3B shows the product stock data 142 when counting of the actual stock quantity of the Product b1 by reading the Bar code B1 is finished. Here, the actual stock quantity is equal to the theoretical stock quantity regarding the Product b1.

When counting of the actual stock quantity of products of one kind is finished, in response to a predetermined input operation by the operator to the operation receiver 15, information on the counted actual stock quantity is sent to the server 3 via the access point 2.

Thereafter, the above operation is repeated for the remaining products, and actual stock quantities are counted for all the products included in the inventory setting information and then sent to the server 3.

In the above operation for the inventory, the operator moves in the store with the handheld terminal 10 in order to read the products placed in various places in the store. In response to this movement, the handheld terminal 10 performs roaming operation for switching the access point 2 as the communication connection target.

The roaming operation of the handheld terminal 10 will be described in the following.

In the position correspondence data 143 stored in the storage 14 of the handheld terminal 10 of the present embodiment, each bar code attached to the product is associated with one of the access points 2 (in the present embodiment, the first access point 2a or the second access point 2b) in advance. Here, the each bar code is set to be associated with an access point 2 capable of performing wireless communication in the best radio wave condition at the position of the product to which the bar code is attached (hereinafter, it may be simply referred to as "the position of the bar code").

Figures 4, 5:
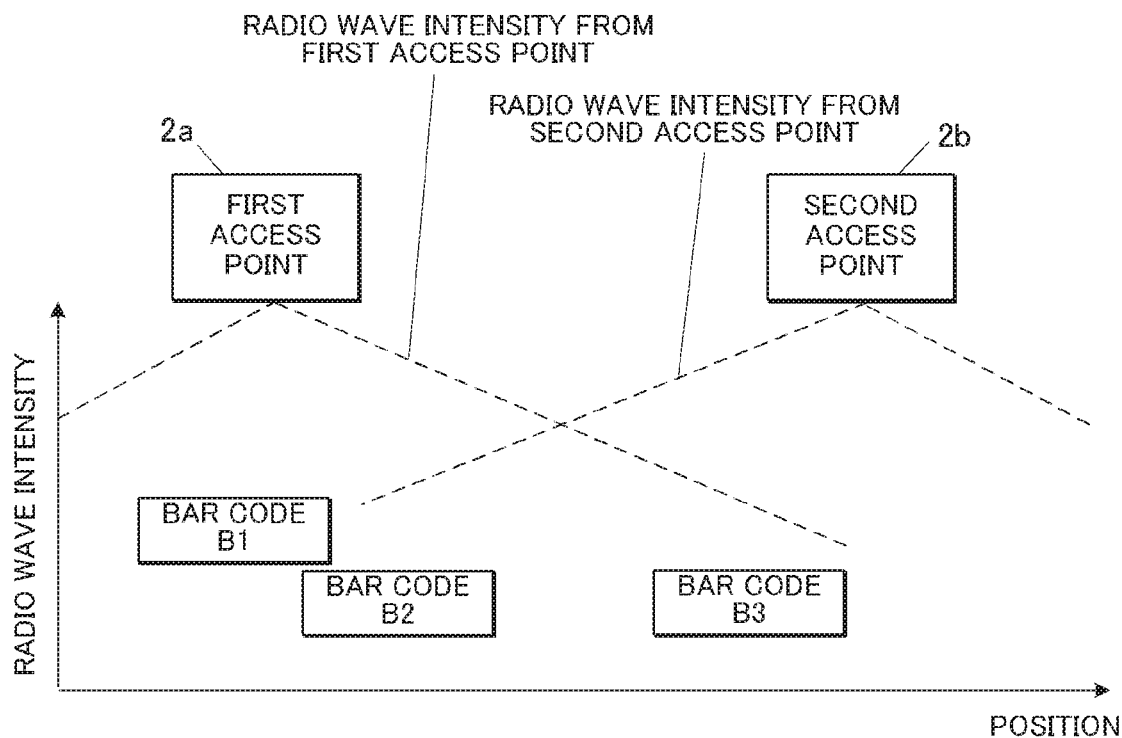
FIG. 4 is a diagram showing an example of a relationship between radio wave intensity distributions from respective access points and positions of respective bar codes.
FIG. 5 is a diagram showing an example of contents of position correspondence data.

FIG. 4 shows an example of a relationship between radio wave intensity distributions from the respective access points and positions of the respective bar codes.

In FIG. 4, the positions of the Bar codes B1 to B3 are each shown on the horizontal axis direction. The radio wave intensities with respect to the position are shown on the vertical axis direction, and the broken lines indicate radio wave intensity distributions each from the first access point 2a and the second access point 2b. In the example of FIG. 4, the radio wave intensity from the first access point 2a is larger than the radio wave intensity from the second access point 2b at the position of each of the Bar codes B1 and B2. Therefore, connection with the first access point 2a leads to communication in a good radio wave condition at the position of each of the Bar codes B1 and B2. Meanwhile, the radio wave intensity from the second access point 2b is larger than the radio wave intensity from the first access point 2a at the position of the Bar code B3. Therefore, connection with the second access point 2b leads to communication in a good radio wave condition at the position of the Bar code B3. As a result, in the position correspondence data 143, the bar codes B1 and B2 are associated with the first access point 2a, and the bar code B3 is associated with the second access point 2b.

FIG. 5 shows an example of the contents of the position correspondence data 143.

In the position correspondence data 143, information relating to the access point 2 is associated with each of the Bar codes B1 to B3 and stored. More specifically, the BSSID of the access point 2 corresponding to each bar code and the channel to be used are stored. The position correspondence data 143 may include further information relating to the access point 2, for example, information on an authentication method, an SSID, and the like.

When reading a bar code, the handheld terminal 10 refers to the position correspondence data 143 and identifies the access point 2 associated with the read bar code. If the identified access point 2 is different from the access point 2 set as the communication connection target at that time, roaming to the identified access point 2 is performed. That is, the access point 2 as the communication connection target is changed to the identified access point 2 as a result of reading the bar code.

More specifically, the BSSID and the channel to be used of the access point 2 corresponding to the read bar code are acquired based on the position correspondence data 143. Then, the BSSID and the channel to be used which are set relating to the access point 2 as the communication connection target are rewritten to the acquired BSSID and the channel to be used, and the access point 2 as the communication connection target is changed.

For example, when the Bar code B3 is read while the first access point 2*a* is set as the communication connection target, the access point corresponding to the read Bar code B3 (in this example, the second access point 2*b*) is different from the access point set as the communication connection target at that time (in this example, the access point 2*a*). Therefore, roaming to the second access point 2*b* is performed.

As described above, in the handheld terminal 10 of the present embodiment, the movement of the handheld terminal 10 causing a predetermined requirement is indirectly detected by identifying the access point 2 associated with the read bar code in advance. Here, the movement causing the predetermined requirement means movement of the position of the handheld terminal 10 such that roaming is required to be performed. In the present embodiment, when the read bar code is the one associated with an access point 2 which is not set as the communication connection target at that time, the movement causing the predetermined requirement is detected and roaming is performed.

Even when the handheld terminal 10 moves for a long distance without reading a bar code, the handheld terminal 10 maintains a wireless connection with any of the access points 2 by roaming when the radio wave intensity from the access point 2 is a predetermined reference value or less. In such roaming, the access point 2 sending the highest radio wave intensity to that position is identified and set as the communication connection target. If there is only one communicable access point 2, it is selected as the communication connection target.

The above reference value is set to be less than the reference value used in conventional roaming, which is based only on the radio wave intensity. For example, the reference value of the present embodiment may be obtained by adding a small margin to the radio wave intensity at which data cannot be sent or received at all. This prevents a defect of increased power consumption due to roaming repeated too much.

The necessity of roaming based on the radio wave intensity may be determined when a predetermined waiting time has elapsed since the access point 2 as the communication connected target was set last. When the waiting time is set to be moderately long, it is possible to prevent a defect of increased power consumption due to too frequent determination of necessity of roaming.

If communication with the access point 2 is performed only at the timing of reading the bar code, for example, roaming based on the above radio wave intensity is not necessary. In this case, roaming may be performed only based on the result of reading the bar code.

Next, inventory processing including roaming processing will be described.

Figure 6:
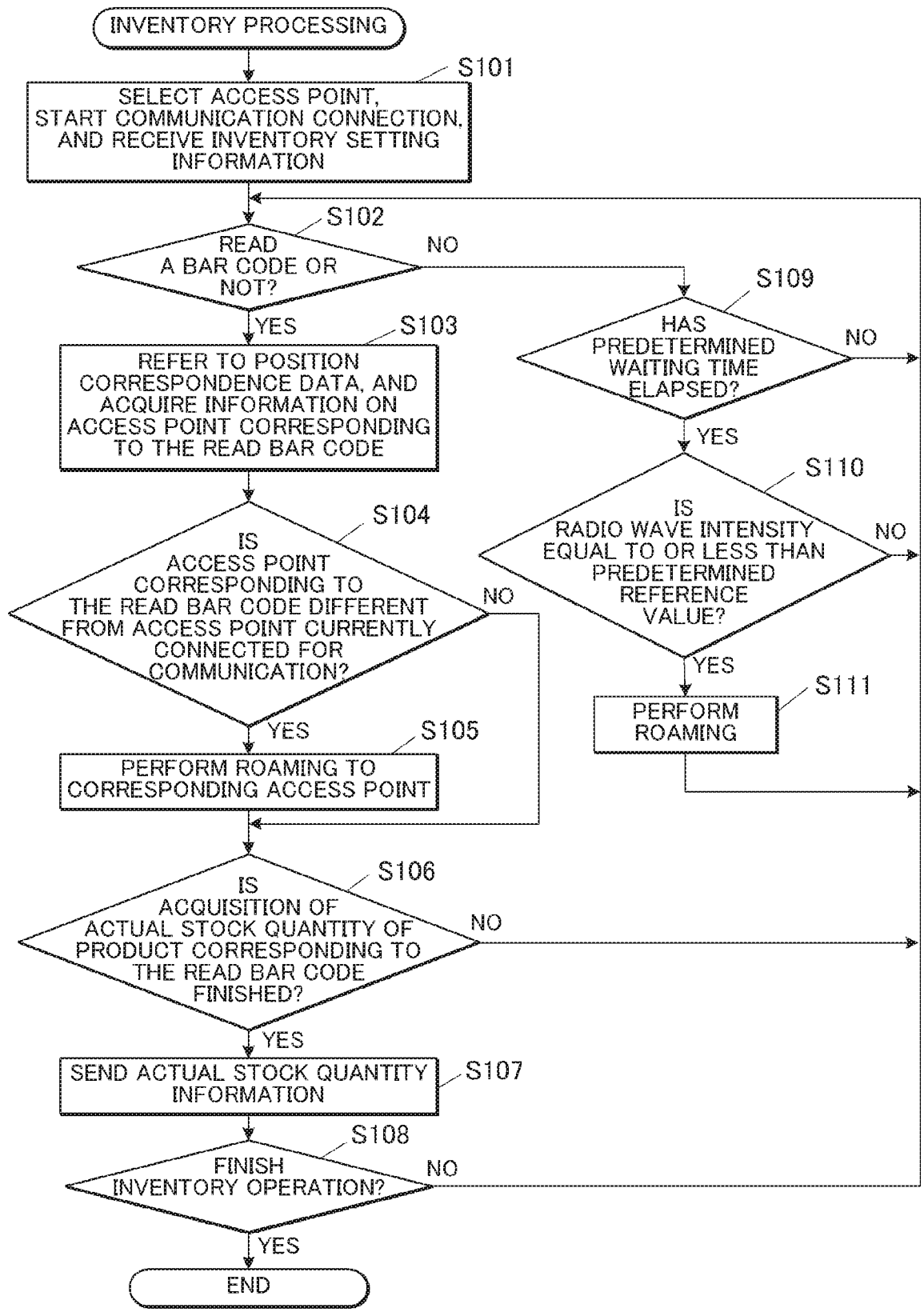
FIG. 6 is a flowchart showing a control procedure in inventory processing.

FIG. 6 is a flowchart showing a control procedure of the inventory processing by the CPU 11.

The inventory processing is started when an operator performs a predetermined input operation of the operation receiver 15 to instruct the handheld terminal 10 to start the inventory processing.

When the inventory processing is started, the CPU 11 performs the radio wave detection process of detecting intensity of the radio wave sent from each access point 2 based on the radio wave intensity signal received from the wireless communication unit 17 as described above. The CPU 11 sets the access point 2 sending the highest radio wave intensity to the current position as the communication connection target and starts the communication connection. Furthermore, the CPU 11 receives the above-described inventory setting information from the server 3 and reflects it in the product stock data 142 (Step S101). If one access points 2 has been set as the communication connection target at the start of the inventory processing, and wireless communication is possible with the set access point 2, the process relating to the setting of the communication connection target in step S101 may be omitted.

The CPU 11 determines whether or not the bar code scanner 18 has read a bar code in response to the input operation by the operator (Step S102). If it is determined that a bar code has not been read (in Step S102, "NO"), the CPU 11 determines whether or not a predetermined waiting time has elapsed since the access point 2 as the communication connection target was set last (Step S109). If it is determined that the predetermined waiting time has elapsed (in Step S109, "YES"), the CPU 11 performs the above-described radio wave detection process based on the radio wave intensity signal from the wireless communication unit 17, and determines whether or not the radio wave intensity from the access point 2 set as the communication connection target is equal to or less than a predetermined reference value (Step S110). If it is determined that the radio wave intensity is equal to or less than the reference value (in Step S110, "YES"), the CPU 11 performs roaming to an optimum access point 2 (Step S111), and returns to the process of Step S102. The process of Step S111 may be the same as the process of Step S101. If it is determined in the process of Step S109 that the predetermined waiting time has not elapsed (in Step S109, "NO") or if it is determined in the process of Step S110 that the radio wave intensity is larger than the reference value (in Step S110, "NO"), the CPU 11 returns to the process of step 102 without roaming.

If it is determined in the process of Step S102 that a bar code has been read (in Step S102, "YES"), the CPU 11 refers to the position correspondence data 143 and acquires information on the access point 2 corresponding to the read bar code (Step S103).

The CPU 11 determines whether or not the access point 2 corresponding to the read bar code is different from the access point 2 currently connected for communication at that time (that is, the access point 2 set as the communication connection target) (Step S104). If it is determined that the access point 2 corresponding to the read bar code is different from the access point 2 currently connected for communication (in Step S104, "YES"), the CPU 11 performs roaming to the access point 2 corresponding to the read bar code (Step S105). That is, the CPU 11 performs a movement detection process and a connection target setting process.

When the process of Step S105 is finished, or when it is determined in the process of Step S104 that the access point 2 corresponding to the read bar code is the same as the access point 2 currently connected for communication (in Step S104, "NO"), the CPU 11 determines whether or not acquisition of the actual stock quantity of the product corresponding to the read bar code is completed (Step S106). Here, if the operator performs predetermined input operation to send the information on the actual stock quantity of the product to the server 3, the CPU 11 determines that the actual stock quantity has been already acquired. If it is not determined that acquisition of the actual stock quantity is completed (in Step S106, "NO"), the CPU 11 returns to the process of Step S102 in order to successively receive the input operation relating to the reading of the bar code.

If it is determined that acquisition of the actual stock quantity has been completed (in Step S106, "YES"), the CPU 11 sends information on the actual stock quantity of the product corresponding to the read bar code to the server 3 via the access point 2 as the communication connection target (Step S107).

When the process of Step S107 is finished, the CPU 11 determines whether or not input operation has been performed for instructing the CPU 11 to finish the inventory operation (Step S108). If it is determined that such input operation has not been performed (in Step S108, "NO"), the CPU 11 returns to the process of Step S102 to receive input operation relating to reading a bar code of a remaining product(s). If it is determined that the input operation has been performed for instructing the CPU 11 to finish the inventory operation (in Step S108, "YES"), the CPU 11 finishes the inventory processing.

The roaming operation in Step S105 may be performed after the process of Step S106 is finished and before the process of Step S107 is started. In this case, the actual stock quantity information can be reliably sent with minimum roaming operation.

When the wireless communication is maintained before the start of the process of Step S107, the roaming operation of Step S105 may be performed after the process of Step S107.

However, while reading bar codes of a same kind attached to products of the same kind repeatedly and counting the actual stock quantity information of the products (loop processing from Step S102 to Step S106), the handheld terminal 10 usually moves only a little, and the movement causing the above predetermined requirement is not detected. Accordingly, the process of Step S105 is not performed more frequently than necessary even according to the control procedure the flowchart of FIG. 6.

Modified Example

Next, a modified example of the first embodiment will be described.

This modified example differs from the above first embodiment in that, when a bar code not included in the position correspondence data 143 is read, information relating to the correspondence between the read bar code and the access point 2 is added to the position correspondence data 143. Hereinafter, differences from the above-described first embodiment will be described.

In the handheld terminal 10 of the modified example, when the read bar code is not included in the position correspondence data 143, the CPU 11 performs an information adding process of adding, to the position correspondence data 143, information that associates the read bar code with the access point 2 set as a communication connection target at the time of reading the bar code. As a result, each time an unregistered bar code is read, the contents of the position correspondence data 143 can be updated. In other words, the handheld terminal 10 can learn the information relating to correspondence between an unregistered bar code and an access point 2. As a result, when the newly registered bar code is read next time, the movement causing the predetermined requirement may be detected based on the information on the access point 2 associated with the read bar code, and roaming can be performed. The updated position correspondence data 143 may be sent to the server 3 and shared with other handheld terminal(s) 10.

When an unregistered bar code is read, the access point sending radio wave of the highest intensity to that position of the read bar code may be identified, and the read bar code and the identified access point 2 may be associated with each other and registered in the position correspondence data 143.

Figure 7:
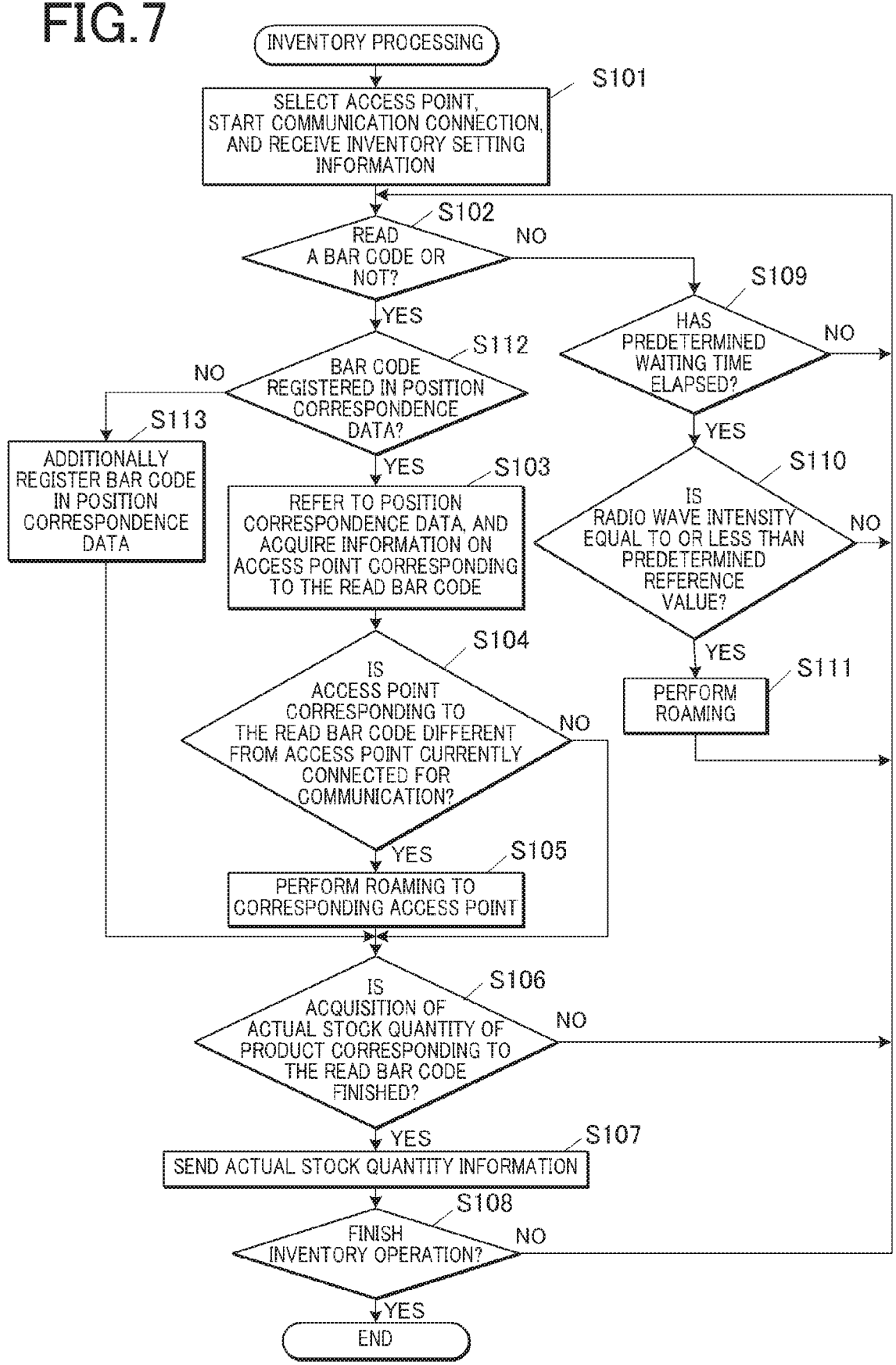
FIG. 7 is a flowchart showing a control procedure in inventory processing according to a modified example.

FIG. 7 is a flowchart showing a control procedure of the inventory processing by the CPU 11 according to the present modified example. The flowchart of FIG. 7 corresponds to the flowchart of FIG. 6 except that the processes of Step S112 and Step S113 are added.

In the inventory processing of the present modified example, if it is determined in the process of Step S102 that a bar code has been read (in Step S102, "YES"), the CPU 11 determines whether or not the read bar code is a bar code registered in the position correspondence data 143 (Step S112). If it is determined that the read bar code has been already registered in the position correspondence data 143 (in Step S112, "YES"), the CPU 11 performs the process of Step S103.

Figure 8:
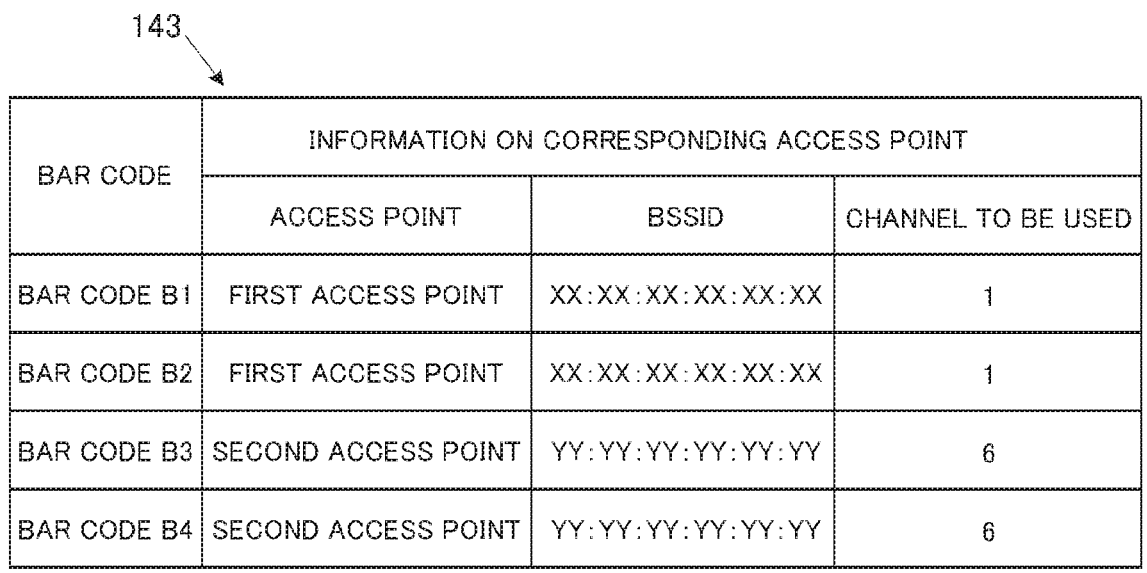
FIG. 8 is a diagram showing an example of contents of position correspondence data according to a modified example.

If it is determined that the read bar code has not been registered in the position correspondence data 143 (in Step S112, "NO"), the CPU 11 additionally registers, in the position correspondence data 143, information associating the read bar code with the access point 2 set as the communication connection target when the unregistered bar code is read (Step S113). For example, if the second access point 2b is the access point 2 as the communication connection target when an unregistered Bar code B4 is read, the CPU 11 adds information associating the Bar code B4 with the second access point 2b to the position correspondence data 143, as shown in FIG. 8. The CPU 11 performs an information addition process in this way.

After finishing the process of step 113, the CPU 11 performs the process of Step S106.

As described above, the handheld terminal 10 as the terminal device according to the first embodiment includes a wireless communication unit 17 that performs wireless communication with one access point 2 set as the communication connection target, a bar code scanner 18 that reads a bar code, and a CPU 11. The CPU 11 performs a connection target setting process of performing setting operation including selection of an access point 2 which the wireless communication unit 17 performs wireless communication with and setting of the access point 2 as the communication connection target. The CPU 11 further performs the movement detection process of detecting the movement of the handheld terminal 10 causing the predetermined requirement based on the bar code read by the bar code scanner 18 and the position correspondence data 143 in which a bar code is associated with the information relating to the position of the bar code. The setting operation in the connection target setting process is performed in response to detection of the movement causing the predetermined requirement.

According to such a configuration, since roaming is triggered by the reading operation of the bar code, it can be performed efficiently at a necessary timing. Therefore, it is possible to suppress an increase in power consumption due to unnecessary roaming processes. Furthermore, the wireless communication can be stabilized and the response can be improved because it is possible to prevent the wireless communication quality from degrading due to absence of roaming at a necessary timing.

Furthermore, the operator only has to read a bar code for acquiring information relating to products (for taking inventory etc.), so that roaming can be performed appropriately and efficiently.

Further, since the movement of the handheld terminal 10 can be detected based on the result of reading the bar code, it is possible to avoid the complicated configuration and the high cost of the handheld terminal 10 for detecting the position. As a result, it is possible to efficiently perform roaming with a simple configuration.

In addition, the information relating to the position of the bar code is information relating to the access point associated with the bar code as an access point 2 wirelessly communicable with the handheld terminal 10 at the position of the bar code. In the movement detection process, the CPU 11 detects movement causing a predetermined requirement when the access point 2 associated with the read bar code in the position correspondence data 143 is different from the access point 2 set to be the communication connection target when the bar code is read. In the connection target setting process, when the movement causing a predetermined requirement is detected, the CPU 11 sets the access point 2 associated with the read bar code according to the position correspondence data 143 to be the communication connection target. In this way, the optimum access point 2 at the position of the read bar code can be easily identified by simply referring to the position correspondence data 143.

Furthermore, according to the modified example, if the information relating to the read bar code is not included in the position correspondence data 143, the CPU 11 performs an information addition process of adding, to the position correspondence data 143, information associating the read bar code with the access point 2 set as the communication connection target when the bar code is read. In this way, the handheld terminal 10 learns information relating to the appropriate access point 2 corresponding to the unregistered bar code.

The bar code is used to identify a product as an item to be identified, and the wireless communication unit 17 sends bar code information relating to the product identified by the read bar code via wireless communication with the access point 2. According to such a configuration, roaming can be performed with reading of a bar code for identifying a product as a trigger. Therefore, roaming can be performed efficiently in parallel with reading of the bar code for inventory, picking, or the like.

In the connection target setting process, when a movement causing the predetermined requirement is detected, the CPU 11 completes the setting operation before the wireless communication unit 17 sends the bar code information. Accordingly, roaming can be performed efficiently at the timing necessary for sending the bar code information. The bar code information may be also sent via wireless communication with the optimum access point 2.

Furthermore, the wireless communication unit 17 sends the stock number of the products as information relating to the products via wireless communication with the access point 2. According to such a configuration, the information on the stock number can be reliably sent to the access point 2 while roaming is efficiently performed in accordance with the reading of the bar code in inventory, picking, or the like.

Further, the CPU 11 performs a radio wave detection process of detecting the intensity of the radio wave sent from the access point 2. In the connection target setting process, if the bar code scanner 18 does not read a bar code for a predetermined period, the CPU 11 sets the access point 2 that sends the most intense radio wave detected in the radio wave detection process as the communication connection target. According to such a configuration, even when the handheld terminal 10 moves for a long distance without reading a bar code, wireless connection can be maintained with either one of the access points 2.

The connection target setting method by the handheld terminal 10 of the present embodiment includes the followings: a connection target setting step in which the access point 2 that the wireless communication unit 17 performs wireless communication with is selected and is set as the communication connection target; and the movement detection step in which movement of the handheld terminal 10 causing the predetermined requirement is detected based on a bar code read by the bar code scanner 18 and the position correspondence data 143 in which the bar code is associated with information relating to the position of the bar code. In the connection target setting step, the setting operation is performed if the movement causing the predetermined requirement for the movement detection step has been detected. According to such a method, roaming can be efficiently performed by the handheld terminal 10 having a simple configuration. Furthermore, the operator only has to read a bar code for acquiring information relating to products (for taking inventory etc.), so that roaming can be performed appropriately and efficiently.

The storage 14 of the present embodiment is a non-temporary computer-readable storage medium where the program 141 executed by the CPU 11 as a processor of the handheld terminal 10 is recorded. The program 141 causes the CPU 11 to perform the followings: the connection target setting process of performing setting operation by selecting an access point 2 with which the wireless communication unit 17 performs wireless communication and setting it as the communication connection target; and the movement detection process of detecting movement of the terminal device causing a predetermined requirement on the basis of the bar code read by the bar code scanner 18 and the position correspondence data 143 in which a bar code is associated with the information relating to the position of the bar code. As a result of operation of the handheld terminal 10 based on such a program, roaming can be efficiently performed with a simple configuration. Furthermore, the operator only has to read a bar code for acquiring information relating to products (for taking inventory etc.), so that roaming can be performed appropriately and efficiently.

Second Embodiment

Next, a second embodiment of the present invention will be described.

The second embodiment differs from the first embodiment regarding the contents of the position correspondence data 143 and the roaming method based on the reference result of the position correspondence data 143. Differences from the first embodiment will be described below.

Figure 9:
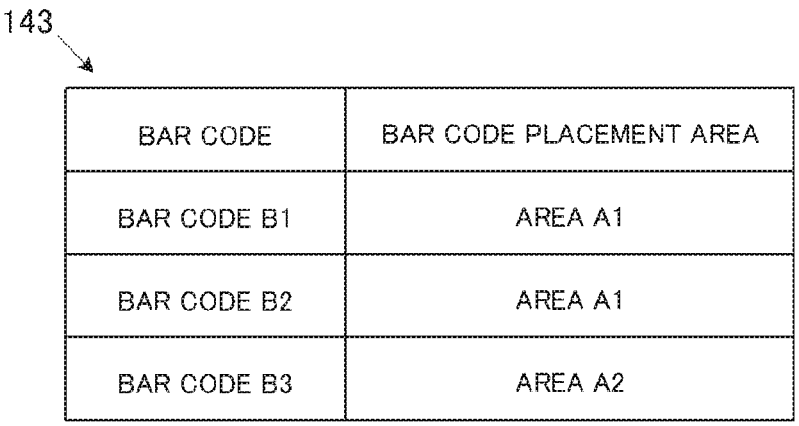
FIG. 9 is a diagram showing an example of contents of position correspondence data according to a second embodiment.

FIG. 9 shows an example of the contents of the position correspondence data 143 according to the second embodiment.

In the position correspondence data 143 of the present embodiment, each of the Bar codes B1 to B3 is associated with an area including the position of the bar code among a predetermined multiple areas (here, Area A1 and Area A2). Here, each of the multiple areas is set within a range capable of communicating with one of the access point 2 in a good radio wave condition.

Figure 10:
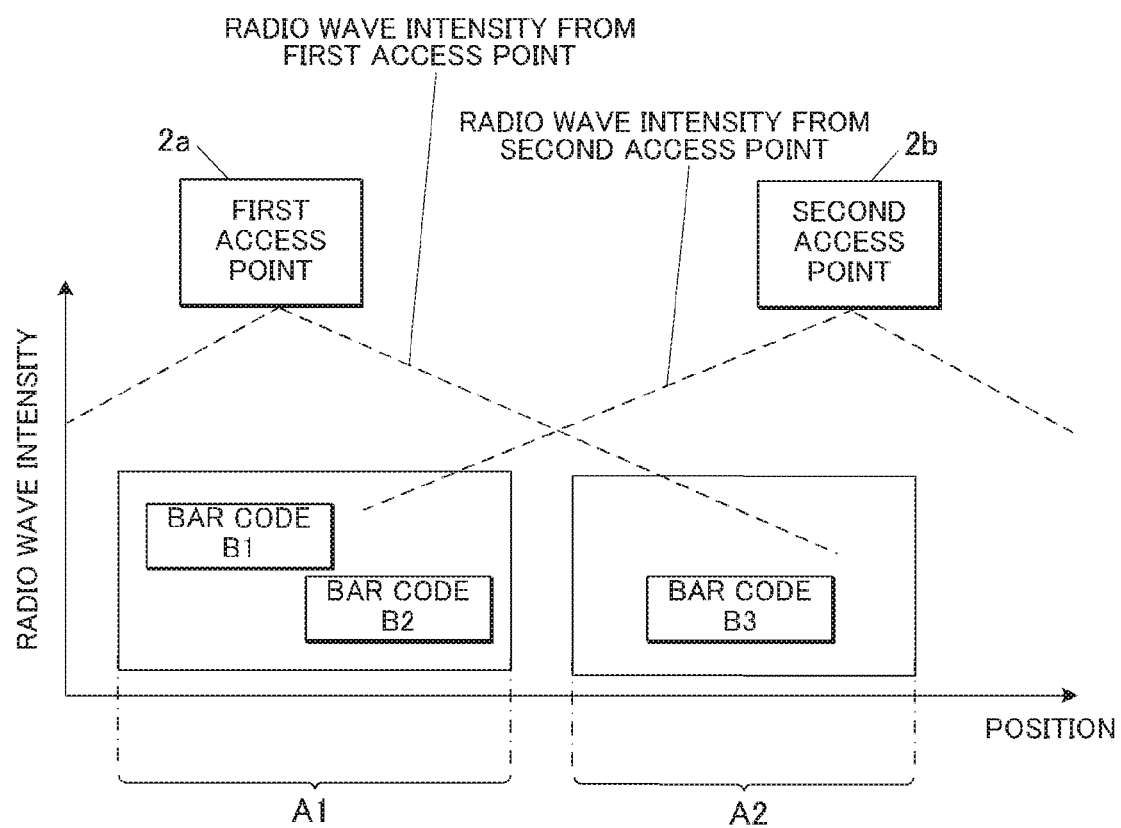
FIG. 10 is a diagram showing an example of relationship between multiple areas and radio wave intensity distributions from individual access points.

FIG. 10 shows an example of the relationship between the multiple areas and the radio wave intensity distributions from individual access points.

In FIG. 10, the Area A1 is set within a range in which communication with the first access point 2a is possible in a good radio wave condition (specifically, the radio wave intensity from the first access point 2a is larger than the radio wave intensity from the second access point 2b within the range). The Area A2 is set within a range in which communication with the second access point 2b is possible in a good radio wave condition (specifically, the radio wave intensity from the second access point 2b is larger than the radio wave intensity from the first access point 2a within the range). The positions of the Bar codes B1 and B2 are in the Area A1, and the position of the Bar code B3 is in the Area A2. The relationship between these bar codes and the areas are registered in the position correspondence data 143 of FIG. 9.

When reading a bar code, the handheld terminal 10 refers to the position correspondence data 143 and identifies the area where the read bar code is located. If the identified area is different from the area associated with the previously read bar code (hereinafter also referred to as a last read area), the movement causing the aforementioned predetermined requirement is detected, and roaming is performed. In such roaming, the access point 2 sending the highest radio wave intensity to that position is identified and set as the communication connection target. If there is only one communicable access point 2, it is selected as the communication connection target.

For example, when the Bar code B3 is read after the Bar code B1 is read, the movement causing the predetermined requirement is detected because the Area A2 corresponding to the read Bar code B3 is different from the Area A1 corresponding to the previously read Bar code B1 according to the position correspondence data 143. As a result, roaming is performed. Since the handheld terminal 10 is in the Area A2 at this time, roaming is performed to the second access point 2b, which sends radio waves of the highest intensity to the Area A2.

In the example shown in FIG. 9 and FIG. 10, the area is associated with the bar code. However, instead of the areas, any information capable of identifying the position, for example, a name of sales floor, a name of room, a floor number (floor), and the like may be associated with the bar code.

Figure 11:
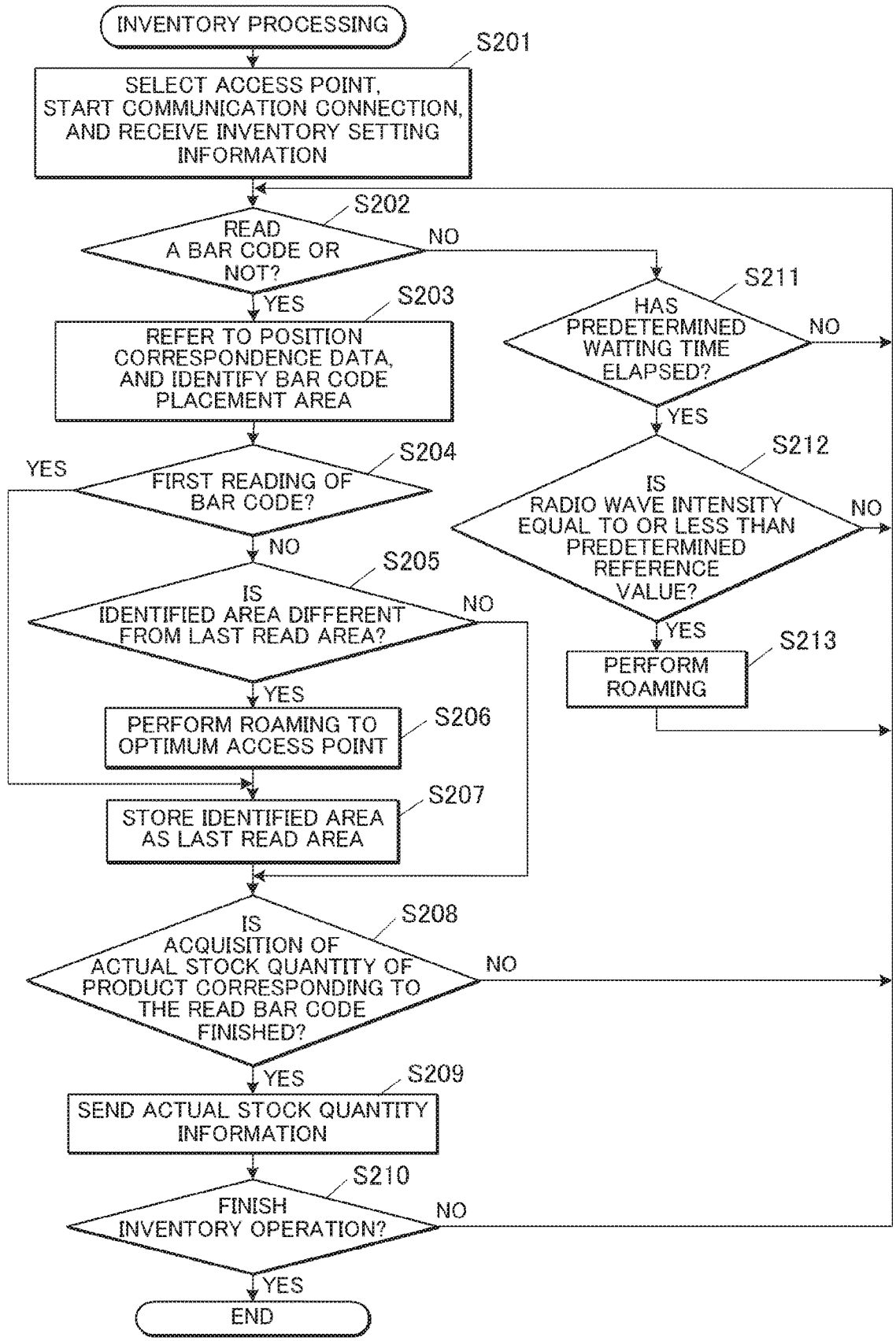
FIG. 11 is a flowchart showing a control procedure in inventory processing according to a second embodiment.

FIG. 11 is a flowchart showing a control procedure of the inventory processing by the CPU 11 according to the second embodiment.

When the inventory processing is started, the CPU 11 sets the access point 2 sending radio waves of the highest intensity as the communication connection target and starts the communication connection. The CPU 11 further receives the above-described inventory setting information from the server 3 and reflects it in the product stock data 142 (Step S201). The CPU 11 determines whether or not a bar code has been read (Step S202). If it is determined that a bar code has not been read (in Step S202, "NO"), the CPU 11 determines whether or not a predetermined waiting time has elapsed (Step S211), determines whether or not the radio wave intensity is equal to or less than a reference value (Step S212), and performs roaming according to the determination results (Step S213). The processes of Step S201, Step S202, and Step S211 to Step S213 are the same as the processes of Step S101, Step S102, and Step S109 to Step S111 in FIG. 6.

If it is determined in the process of Step S202 that a bar code has been read (in Step S202, "YES"), the CPU 11 refers to the position correspondence data 143 and identifies an area where the read bar code is placed (Step S203).

The CPU 11 determines whether or not the reading of the bar code in Step S202 is the first reading (Step S204). If it is determined that the reading is the first reading (in Step S204, "YES"), the CPU 11 stores the area identified in Step S203 in the storage 14 as the last read area (Step S207).

If it is determined that the reading of the bar code is for the second time or later (in Step S204, "NO"), the CPU 11 determines whether or not the area identified in the Step S203 is different from the last read area stored in the storage 14 (Step S205). If it is determined that the identified area is different from the last read area (in Step S205, "YES"), the CPU 11 compares the radio wave intensities from the respective access points 2 and performs roaming to the optimum access point 2 (Step S206). That is, the CPU 11 performs the movement detection process and the connection target setting process. Furthermore, the CPU 11 stores the area identified in Step S203 as the last read area in the storage 14 (Step S207).

When the process of Step S207 is finished, or when it is determined in the process of Step S205 that the identified area is the same as the last read area (in Step S205, "NO"), the CPU 11 determines whether or not acquisition of the actual stock quantity of the product corresponding to the read bar code is completed (Step S208). If it is not determined that acquisition of the actual stock quantity is completed (in Step S208, "NO"), the CPU 11 returns to the process of Step S202 in order to successively receive the input operation relating to the reading of the bar code.

If it is determined that acquisition of the actual stock quantity has been completed (in Step S208, "YES"), the CPU 11 sends information on the actual stock quantity of the product corresponding to the read bar code to the server 3 via the access point 2 as the communication connection target (Step S209).

When the process of Step S209 is finished, the CPU 11 determines whether or not input operation has been performed for instructing the CPU 11 to finish the inventory operation (Step S210). If it is determined that such input operation has not been performed (in Step S210, "NO"), the CPU 11 returns to the process of Step S202 to receive input operation relating to reading a bar code of a remaining product(s). If it is determined that the input operation has been performed for instructing the CPU 11 to finish the inventory operation (in Step S210, "YES"), the CPU 11 finishes the inventory processing.

As described above, the information relating to the position of the bar code according to the second embodiment is information indicating an area associated with the bar code in which the read bar code is located among a predetermined multiple areas. In the movement detection process, if the area associated with the read bar code is different from the area associated with the previously read bar code according to the position correspondence data 143, the CPU 11 detects the movement causing the predetermined requirement. As a result, roaming can be performed efficiently at a necessary timing using the position correspondence data 143 of a simple configuration in which the bar code is associated with the area.

Furthermore, the CPU 11 performs the radio wave detection process of detecting the intensity of the radio wave from the access point 2. In the connection target setting process, if the movement causing the predetermined requirement is detected and there are multiple access points 2 wirelessly communicable with the terminal device 10, the CPU 11 sets, as the communication connection target, the access point 2 that sends the most intense radio wave detected among the multiple access points 2. Thus, roaming can be performed to the optimum access point 2 at the position of the read bar code.

In the above description, the HDD and/or the SSD of the storage 14 are used as a computer readable storage medium storing the programs of the present invention, but are not intended to limit the present invention. The computer storage medium may be a flash memory or a portable recording/storage medium, such as a CD-ROM. Further, as a medium to provide data of the programs of the present invention via a communication line, a carrier wave can be used.

The matters described in the above embodiments are merely some of preferred examples of the terminal device, the connection target setting method, and the storage medium of the present invention, and are not intended to limit the present invention.

For example, the bar code does not have to be attached to an item such as a product directly, but may be attached to a shelf or a wall of a room where the product is displayed.

Furthermore, the identification mark is not limited to a bar code as in the above embodiments, but may be any mark as long as it can be used for identification of the target to be identified. For example, the identification mark may be a character, a figure, or a combination thereof. As the identification mark, a serial number of a product or a product code may be used as it is.

Furthermore, the identification mark is not limited to one mainly used to identify an item such as a product, but may be one mainly used to acquire only position information used for determining whether or not roaming is necessary.

In the above description, multiple access points 2 are provided on one floor in a facility, but may be provided on respective floors or over multiple facilities.

In the above embodiment, the handheld terminal 10 that performs wireless LAN communication with the access point 2 has been described as an example. However, the present invention is not limited to this, but may be applied to any terminal device that can perform wireless communication while switching the wireless communication device as the communication connection target.

Besides, it goes without saying that the detailed configuration and operation of each component of the handheld terminal 10 as the terminal device in the above embodiment can be appropriately modified without departing from the scope of the present invention.

Although one or more embodiments have been described, the scope of the present invention is not limited to the embodiments, and includes the scope of claims below and the scope of their equivalents.

What is claimed is:

1. A terminal device comprising:
   a communication unit that performs wireless communication with one wireless communication device set as a communication connection target;
   a reader that reads a predetermined identification mark; and
   a processor that performs:
   a connection target setting process including selection of a wireless communication device with which the communication unit performs wireless communication and setting operation of setting the wireless communication device as the communication connection target; and
   a movement detection process of detecting a movement of the terminal device causing a predetermined requirement based on a read identification mark that is read by the reader and position correspondence information in which an identification mark is associated with information relating to a position of a corresponding identification mark; wherein,
   if a movement causing the predetermined requirement is detected in the movement detection process, the setting operation is performed in the connection target setting process, and wherein,
   the processor further performs a radio wave detection process of detecting intensity of radio wave sent from the wireless communication device, and
   if the reader does not read an identification mark for a predetermined period, in the connection target setting process, the processor sets, as the communication connection target, a wireless communication device that sends the most intense radio wave detected in the radio wave detection process.

2. The terminal device according to claim 1, wherein,
   the information relating to a position of a corresponding identification mark relates to a wireless communication device that is associated with the identification mark and wirelessly communicable with the terminal device at the position of the identification mark, and
   if a wireless communication device associated with the read identification mark in the position correspondence information is different from a wireless communication device set as the communication connection target at a time when the read identification mark is read, in the movement detection process, the processor detects a movement causing the predetermined requirement, and
   if a movement causing the predetermined requirement is detected in the movement detection process, in the connection target setting process, the processor sets a wireless communication device associated with the read identification mark in the position correspondence information as the communication connection target.

3. The terminal device according to claim 2, wherein,
   if information relating to the read identification mark is not included in the position correspondence information, the processor performs an information addition process of adding, to the position correspondence information, information in which the read identification mark is associated with a wireless communication device set as the communication connection target at a time when the read identification mark is read.

4. The terminal device according to claim 1, wherein,
   the information relating to a position of a corresponding identification mark indicates an area associated with the identification mark, the identification mark being located in the area among a predetermined multiple areas, and
   if an area associated with the read identification mark in the position correspondence information is different from an area associated with an identification mark previously read by the reader, in the movement detection process, the processor detects a movement causing the predetermined requirement.

5. The terminal device according to claim 4, wherein,
   the processor performs a radio wave detection process of detecting intensity of radio wave sent from the wireless communication device, and
   if a movement causing the predetermined requirement is detected in the movement detection process and if there are multiple wireless communication devices wirelessly communicable with the terminal device, in the connection target setting process, the processor sets, as the communication connection target, a wireless communication device that sends the most intense radio wave detected in the radio wave detection process among the multiple wireless communication devices.

6. The terminal device according to claim 1, wherein,
the identification mark is used in identification of an item to be identified, and
the communication unit sends information relating to an item identified using the read identification mark via wireless communication with the wireless communication device.

7. The terminal device according to claim 6, wherein,
if movement causing the predetermined requirement is detected in the movement detection process, in the connection target setting process, the processor completes the setting operation before the communication unit sends the information relating to the item.

8. The terminal device according to claim 6, wherein,
the communication unit sends information on actual stock quantity of the item as the information relating to an item via wireless communication with the wireless communication device.

9. A connection target setting method performed by a terminal device having a communication unit and a reader, the communication unit performing wireless communication with one wireless communication device set as a communication connection target, and the reader reading a predetermined identification mark,
the connection target setting method comprising:
connection target setting including selection of a wireless communication device with which the communication unit performs wireless communication and setting operation of setting the wireless communication device as the communication connection target; and
a movement detection of detecting a movement of the terminal device causing a predetermined requirement based on a read identification mark that is read by the reader and position correspondence information in which an identification mark is associated with information relating to a position of a corresponding identification mark; wherein,
if a movement causing the predetermined requirement is detected in the movement detection, the setting operation is performed in the connection target setting, and further comprising,
a radio wave detection of detecting intensity of radio wave sent from the wireless communication device, and
if the reader does not read an identification mark for a predetermined period, in the connection target setting, setting, as the communication connection target, a wireless communication device that sends the most intense radio wave detected in the radio wave detection.

10. A non-transitory computer-readable storage medium in which a program executed by a processor of a terminal device is stored, the terminal device having a communication unit and a reader, the communication unit performing wireless communication with one wireless communication device set as a communication connection target, and the reader reading a predetermined identification mark, wherein,
the program controls the processor to execute:
a connection target setting process including selection of a wireless communication device with which the communication unit performs wireless communication and setting operation of setting the wireless communication device as the communication connection target; and
a movement detection process of detecting a movement of the terminal device causing a predetermined requirement based on a read identification mark that is read by the reader and position correspondence information in which an identification mark is associated with information relating to a position of a corresponding identification mark, and
if a movement causing the predetermined requirement is detected in the movement detection process, the setting operation is performed in the connection target setting process, and wherein,
the processor further performs a radio wave detection process of detecting intensity of radio wave sent from the wireless communication device, and
if the reader does not read an identification mark for a predetermined period, in the connection target setting process, the processor sets, as the communication connection target, a wireless communication device that sends the most intense radio wave detected in the radio wave detection process.

* * * * *